Oct. 26, 1943.  A. C. BASS  2,332,495
FLAT BELT
Filed May 15, 1942

INVENTOR.
Albert C. Bass
BY
ATTORNEY

Patented Oct. 26, 1943

2,332,495

UNITED STATES PATENT OFFICE 2,332,495

FLAT BELT

Albert C. Bass, Chicago, Ill.

Application May 15, 1942, Serial No. 443,077

2 Claims. (Cl. 74—231)

This invention relates to a new and useful improvement in flat belts, and, in particular, in such belts for short vertical drives, which, it is well known, are particularly hard on belts and for use in connection with belt shifters which, as the result of the continual friction of the shifter fork, tend to open up the edges and loosen the cement. For the same reason the belt of this invention is unusually durable when used on flange pulleys.

The belting of this invention is a folded belt which permits of the use of relatively light leather to secure a relatively heavy belt. Also, its exposed surfaces consist wholly of smooth, close fiber, grain leather which affords the greatest resistance to wear in general, and, in particular, at the edges from a shifter fork.

Another advantage is that since it is folded, and, consequently, both plies have the same characteristics, there will be no tendency for one ply to stretch differently than the other, and for the same reason, the belt will run straight.

In addition, this belt is slightly thicker and more compact adjacent its edges than in the middle so that its working surface is slightly concave. In consequence, it makes better contact with the pulley than the ordinary flat belt, resulting in less slippage and greater power transmission.

One form of the belt of this invention is shown in the drawing, of which—

As shown in Figs. 1-4 the belt is made from a strip of leather 1, substantially twice as wide and half as thick as the finished belt.

Figure 1:
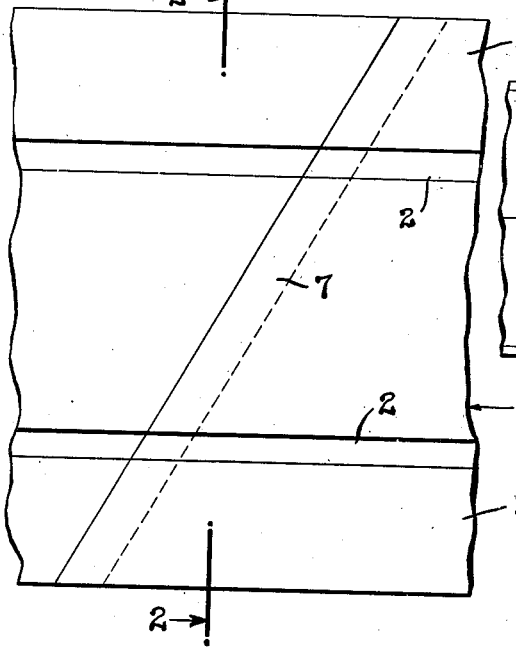
Fig. 1 is a plan view of a short section of the leather strip from which the belt is made, showing the manner in which it is prooved.

As shown in Fig. 1, the flesh side of strip 1 is grooved longitudinally on either side of the center so that when the outer portions 3 are folded inwardly, the edges will meet. In the bottom of each of these grooves 2 is a hump 4.

When the strip is folded upon grooves 2, with the flesh side in and cemented under pressure, hump 4 in the middle of the groove will in effect produce a double hinge, one on either side of the hump, and will also interpose itself between these hinges, with the result that the edge 5 of the folded belt will be definitely rounded and will contain a little more leather than the rest of the belt, i. e., that composing the hump 4. In consequence, the edges 5 of this belt will be extremely solid and shaped to resist wear to best advantage, and the belt will be slightly concave so that it will present an unusually large surface to the usual convex pulley.

Figure 6:
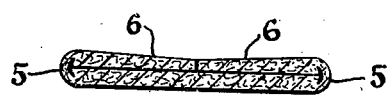
Fig. 6 is a cross section on the line 6—6 of Fig. 5 of a belt made from this strip.

The concavity of the belt can be increased if desired by slightly beveling the outer portions of the strip outside of grooves 2 before cementing and folding, as shown at 6 in Figure 6. When the belt is completed by folding and cementing, the center portion will obviously be more concave than in the belt first described.

Figure 3:
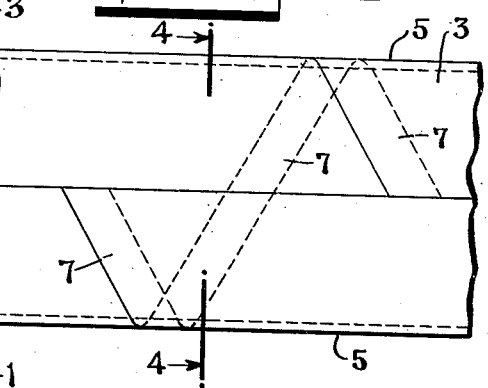
Fig. 3 is a plan view of a section of finished belt.
Figure 4:
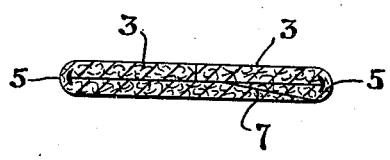
Fig. 4 is a cross section of the belt on the line 4—4 of Fig. 3.
Figure 2:
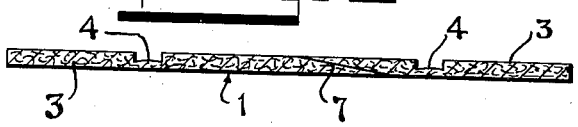
Fig. 2 is a cross section of the strip on the line 2—2 of Fig. 1.
Figure 5:
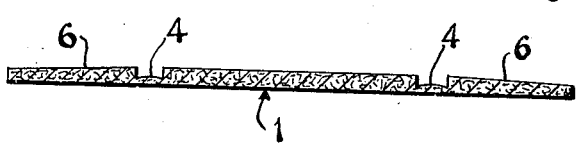
Fig. 5 is a plan view of a slightly modified form of the leather strip.

The ends of this belt may be connected in any desired way, but a diagonal lap is recommended. This is shown in Figures 1 and 3. To make it, the ends of the strip are beveled in opposite directions and cemented together before folding, as shown at 7 in Figure 1. Then when the strip is folded, the diagonal joint becomes a zigzag, as shown in Figure 3, no part of it lying above any other part. In other words, every part of the joint 7 is over or underlaid by solid leather. This makes a long, strong joint and one which is diagonal to the line of travel so that it will pass smoothly over the pulley.

I claim:

1. A belt consisting of a grain leather strip having two longitudinal grooves on the flesh side, each midway between an edge and the center, each of said grooves having a hump in its center, said strip being folded upon said grooves on either side of said hump flesh side in and the opposing surfaces cemented together.

2. A belt consisting of a grain leather strip having two longitudinal grooves on the flesh side, each midway betweeen an edge and the center, each of said grooves having a hump in its center, the portions of said strip outside of said grooves being beveled outwardly, said strip being folded upon said grooves on either side of said hump flesh side in and the opposing surfaces cemented together.

ALBERT C. BASS.